(12) United States Patent
Berzon et al.

(10) Patent No.: US 8,029,707 B2
(45) Date of Patent: Oct. 4, 2011

(54) SURFACE CASTING ONTO A POLYCARBONATE PHOTOCHROMIC SUBSTRATE

(75) Inventors: Ronald Berzon, St. Petersburg, FL (US); Eric Johnson, Pinella Park, FL (US); Herbert Mosse, Lutz, FL (US)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 41 days.

(21) Appl. No.: 12/302,214

(22) PCT Filed: Jun. 7, 2006

(86) PCT No.: PCT/US2006/022153
§ 371 (c)(1),
(2), (4) Date: Nov. 24, 2008

(87) PCT Pub. No.: WO2007/145611
PCT Pub. Date: Dec. 21, 2007

(65) Prior Publication Data
US 2009/0116126 A1    May 7, 2009

(51) Int. Cl.
*B29D 11/00* (2006.01)
(52) U.S. Cl. .................................................. 264/2.2
(58) Field of Classification Search ............ 264/1.7, 264/2.2; 156/285
See application file for complete search history.

(56) References Cited

U.S. PATENT DOCUMENTS

| | | | |
|---|---|---|---|
| 5,531,940 A * | 7/1996 | Gupta et al. | 264/1.7 |
| 5,702,819 A | 12/1997 | Gupta et al. | |
| 6,455,653 B1 | 9/2002 | Nunez et al. | |
| 6,630,083 B1 | 10/2003 | Nunez et al. | |
| 2003/0017340 A1* | 1/2003 | Jiang et al. | 428/412 |
| 2004/0194880 A1* | 10/2004 | Jiang et al. | 156/285 |
| 2005/0089630 A1 | 4/2005 | Schlunt et al. | |

FOREIGN PATENT DOCUMENTS

| | | |
|---|---|---|
| AU | 198780556A1 A1 | 6/1988 |
| WO | WO0161382 A1 | 8/2001 |
| WO | WO02096627 A1 | 12/2002 |
| WO | WO03004255 A2 | 1/2003 |
| WO | WO2005118268 A1 | 12/2005 |
| WO | WO2006133307 A2 | 12/2006 |

\* cited by examiner

*Primary Examiner* — Christina Johnson
*Assistant Examiner* — Larry Thrower
(74) *Attorney, Agent, or Firm* — Keusey & Associates, P.C.

(57) ABSTRACT

A system and method for providing photochromic segmented multifocal optical lenses. A latex primer formulation is provided for effectuating adhesion of a surface casting composition onto a lens having a photochromic coating. The method provides efficient, cost effective production of durable photochromic segmented lenses, via secure adhesion of a surface casting layer onto a photochromic substrate while maintaining desirable optical characteristics. A composite optical lens is advantageously formed having a photochromic base lens, a primer composition bonded to a convex surface of said base lens, and a cured casting composition bonded to said primer composition layer. The cured casting formulation includes a segment region to impart multifocal qualities onto the resultant composite optical lens.

9 Claims, 1 Drawing Sheet

SURFACE CASTING ONTO A POLYCARBONATE PHOTOCHROMIC SUBSTRATE

BACKGROUND OF THE INVENTION

1. Technical Field

The present invention relates to surface casting or overmolding lens casting onto a photochromic polycarbonate substrate and a method to achieve same.

2. Description of Related Art

Optical lenses are typically manufactured from polycarbonate due to the myriad of advantages such material offers which make it ideally suited for optical use. Namely, polycarbonate possesses a high index of refraction, blocks all UVA and UVB radiation, is an ideal candidate for injection molding processes, is easily drilled (e.g., for securing to eye frames), and is lightweight and highly impact resistant.

Some polycarbonate lenses further include photochromic materials or additives. Photochromic lenses change from light to dark when exposed to ultraviolet (UV) radiation. Typically, molecules of the active ingredient in the photochromic additive that causes the lenses to transform are incorporated evenly throughout the lens material. However, in instances where a particularly strong prescription lens is made, the thickest parts of the lens will become darker upon exposure to UV light than the thinner portions. In addition, if there is a large difference in prescription between the two eyes of a wearer, the lens with the stronger prescription will become darker upon exposure to UV light than the weaker one.

To achieve a uniform color density throughout the lenses regardless, e.g., of the lens prescription and/or lens thickness, photochromic coatings have been developed which are added as a layer or coating onto the surface of the lens. Such coatings result in an even darkening of the overall lens regardless of lens prescription or thickness.

However, polycarbonate coated with photochromic additives is relatively delicate and vulnerable to scratches and other surface insults. When a lens is scratched or otherwise damaged, the optical properties of the lens are negatively affected. Various methodologies for imparting scratch resistance to polycarbonate lenses are known, among them the application or integration of scratch-resistant coatings to the lens itself.

For users with, e.g., presbyopia, lenses must be designed to offer more than one focal point or lens power (multifocal lenses) within each lens. Such lenses are often configured such that the area of the lens that offers a separate focal distance is segmented and projects away from at least one major optical surface of the lens. Such segmented lenses may include, e.g., a raised or protruding area (segment) which is elevated from the rest of the lens area, and thus have a segment line or ridge separating the powers. Segmented lenses thus have a non-uniform surface profile. Straight top bifocal lenses are one example, having a "D" shaped segment with a top straight protruding edge dedicated to one focal distance.

One method for producing ophthalmic lenses involves the casting of a surface onto an optical wafer, or preform, to form a lens. Advantageously, the casting of a surface onto an optical perform can reduce the number of molds required to produce a full prescriptive range of lenses and thus is cost-effective. However, successful and secure adhesion of the casting surface onto the lens is often a problem. In particular, successful adhesion of a surface onto a lens having a photochromic coating is especially difficult to achieve.

The challenge thus far is to produce a uniformly photochromic segmented lens in a cost effective and most efficient manner that exhibits excellent durability and scratch resistance. Indeed, using current viscous photochromic coating deposition techniques, it is extremely difficult, if not impossible, to produce a durable polycarbonate photochromic semi-finished segmented (multifocal) optical lens.

U.S. Pat. No. 5,531,940 describes various methods for making optical plastic lenses with photochromic additives. U.S. Pat. No. 5,702,819 describes methods for producing scratch resistant lenses inexpensively. U.S. Pat. No. 6,455,653 describes a composition suitable for use as a cast layer over a preform. U.S. Pat. No. 6,630,083 discusses methods and compositions for producing lenses by casting, namely, via a two-stage ultraviolet cure. Australian Patent No. 80556/87 describes a casting method for a polymeric lens substrate which involves the roughening of the surface of the lens so as to promote subsequent adhesion of the casting material.

Photochromic (PhCh) semi-finished straight top (SFST) lenses have been made by injection molding polycarbonate (PC) behind a photochromic wafer. The wafer is typically a tri-layer of PC/PhCh/PC. However, while injection molding may provide a photochromic polycarbonate lens, it requires a significant investment in costly machinery.

Accordingly, an efficient and effective technique for producing polycarbonate photochromic lenses, in particular photochromic segmented lenses is highly desirable.

SUMMARY OF THE INVENTION

It is an object of the present invention to provide an improved technique for producing a polycarbonate photochromic segmented optical lens.

It is a further object of the present invention to provide successful adhesion of a surface casting layer onto a lens coated with photochromic material.

According to an aspect of the present invention, a composite optical lens is provided comprising a photochromic base lens, a primer composition applied to the convex surface of said base lens, and a cured casting composition bonded to said primer composition layer, said cured casting formulation including a segment region.

According to another aspect of the present invention, a method for producing a photochromic multifocal optical lens is provided comprising the steps of providing a mold assembly including a segment region and a polycarbonate lens having a photochromic coating on a front surface of said lens and applying a primer formulation to the lens and drying/curing the same to produce a primer coated photochromic lens. A surface casting monomer solution is applied into the mold, wetting out the segment region and the primer coated photochromic lens is placed into the mold, such that the front surface of the primer-coated lens contacts the casting layer. The assembly is cured to produce a segmented photochromic optical lens.

According to yet another aspect of the present invention, a composition formed to impart adhesive abilities on a substrate is provided comprised of about 35 parts by weight of polyurethane latex, about 15 parts by weight of 2-butoxy ethanol, about 50 parts by weight of deionized water, and about 5 parts by weight of a coupling agent.

These and other aspects, features and advantages of the present invention will be described or become apparent from the following detailed description of the preferred embodiments, which is to be read in connection with the accompanying drawings.

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views.

DETAILED DESCRIPTION OF PREFERRED EMBODIMENTS

Figure 1:
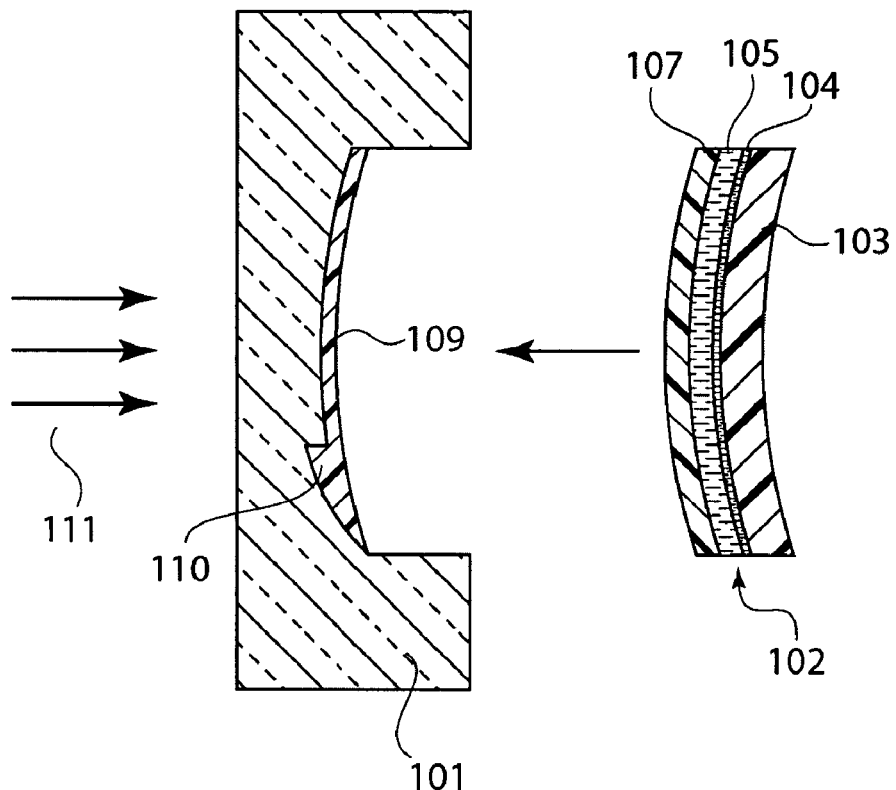
FIG. 1 is an exemplary cross sectional view of an assembly including a mold, a photochromic lens and a monomer solution according to an embodiment of the present invention.
Figure 2:
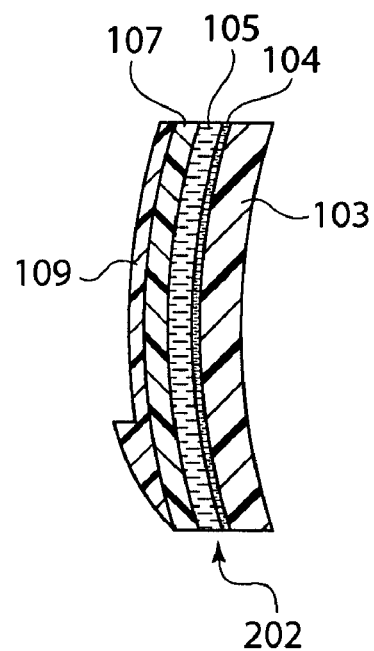
FIG. 2 is a cross sectional view of an exemplary photochromic segmented optical lens according to an aspect of the present invention.

The present invention provides methods and compositions for manufacturing polycarbonate photochromic segmented optical lenses which provide photochromic features and multifocal capabilities in one lens in a cost-effective manner. Namely, the objectives of the present invention are achieved through a novel primer formulation and surface casting methodology described herein with reference to the Figures.

One aspect of the present invention comprises a novel primer layer placed on the front surface of a semi-finished single vision (SFSV) photochromic lens to facilitate adhesion with an ultraviolet (UV) curable surface casting layer. Such casting layer is used, e.g., to impart multifocal capabilities to the lens, e.g., the addition of a bifocal segment. Advantageously, the present invention enables the creation of photochromic segmented optical lenses from pre-made and/or pre-existing photochromic polycarbonate lenses (e.g., photochromic coated single vision lenses). Therefore, the present invention provides a fast, economical and reliable method for producing photochromic segmented optical lenses.

In one embodiment, the present invention provides a method for producing a photochromic segmented optical lens comprising the steps of: a) providing an ultraviolet (UV) light transparent mold assembly having a segment region and a polycarbonate (PC) lens having a photochromic coating; b) preparing and applying a latex primer formulation to the lens (e.g., via spin coating, or other methods) and drying same to produce a primer coated photochromic lens; c) applying an acrylic surface casting monomer solution into the mold, wetting out the segment region; d) placing the primer coated photochromic lens into the mold, such that the primer-coated surface is atop the casting layer, and ensuring that an even gap exists between the mold surface and the lens surface; and e) curing the assembly to produce a segmented photochromic optical lens.

The term "segment region" refers to a region/cavity in the mold assembly which is shaped to create a multifocal lens segment, e.g., a bifocal segment. For example, such segment may comprise a D-shaped segment (so as to produce a straight top lens) that has a different prescription (focal point) from the rest of the lens. Accordingly, a mold used according to the present invention may preferably comprise a mold having a straight top segment region (e.g., a semi-finished straight top mold). The term "multifocal lens" may comprise a lens having e.g., bifocal, trifocal, etc. capabilities (e.g., a lens including a bifocal or trifocal segment, etc.).

A "semi-finished lens" is typically a thick (e.g., around 6-12 mm) lens with the final optical geometry on one side (e.g., the front (convex) side). The back (concave) side may be ground and polished to the required shape and center thickness to complete the lens. A "finished lens" is a lens manufactured with both desired front and back curves created into the lens with no additional grinding/polishing required, i.e., the center of the lens is already at the desired thickness.

A "5-base SFSV lens" is a semi-finished single vision lens with a lens curvature characterized as a 5.00 diopter base curve. Lenses have a number of curved geometries designated by curve radius or diopter. As described below, a 5-base SFSV photochromic lens was utilized in the following examples. However, lenses with other exemplary base curves may be used, e.g., 1-base, 2-base, 4-base, 6-base, 8-base, etc. In the context of the present invention, curvature refers to the average of the two curvatures that are defined at any point in a surface along two perpendicular directions. Mathematically speaking, curvature is equal to the inverse of the curvature radius; that is, curvature increases when radius is reduced.

FIG. 1 is an exemplary cross sectional view of an assembly including a mold, a photochromic lens and a monomer solution according to an embodiment of the present invention. A base lens 103 is provided, which preferably comprises a semi-finished single vision polycarbonate lens having photochromic properties. For example, the lens 103 may include a photochromic coating or layer 105 on its front (convex) surface.

It is noted that base lens 103 may optionally comprise a lens having, e.g., a PDQ® hard coat layer 104 on its convex surface, onto which the photochromic layer 105 may be applied. Such hard coating layer 104 serves, e.g., to prevent the photochromic layer 105 from migrating into the base lens 103.

According to an aspect of the present invention, a primer formulation 107 is prepared and applied as a layer to the photochromic lens and subsequently dried to form a primer-coated photochromic lens 102. The primer 107 preferably comprises a novel primer formulation which may be applied to the photochromic lens, e.g., via spin coating or other techniques. The primer formulation 107 according to the present invention preferably includes a polyurethane latex component, but however, is not limited to polyurethane latex primers and may include other types, such as water-based acrylic emulsions, etc. A coupling agent is preferably included for assisting in uniting separate entities. That is, e.g., one end group of a molecule of the coupling agent may be attached/favored to one entity (e.g., the primer formulation) while another end group of the molecule may be reactive/attracted to, e.g., the casting layer. Details of preferred components of the primer formulation according to the present invention and their respective desirable parts by weight are described further below in the Examples.

A mold 101 is provided, e.g., which may include a segment region 110. The mold assembly 101 is preferably transparent to ultraviolet (UV) light at least at the front of the mold (e.g., UV light may be directed in the direction of arrows 111 to penetrate the mold 101 thereat). Preferred mold materials for a mold assembly according to the present invention may comprise glasses (e.g., Crown glass) or plastics transparent to ultraviolet light. Means for making and fashioning appropriate molds for use in accordance with the present invention are well known in the art. Practically any material can be used as long as the material provides for, e.g., proper wetting characteristics, proper release characteristics and is compatible with the specific cure process(es) utilized (e.g., UV cure, thermal cure, etc.).

A surface casting formulation 109 is placed into the mold 101, wetting out the segment region 110. According to an aspect of the present invention, as discussed further below, the surface casting layer 109 is enabled to be bonded to a photochromic base lens, thus imparting, e.g., multifocal properties (e.g., bifocal, trifocal) capabilities to the lens. The casting formulation may comprise individual monomers or mixtures thereof of acrylates and/or methacrylates, styrenics, thio (meth)acrylates, vinyls, and/or allyics. Functional polymers such as acrylic terminated polyurethanes can also be included. Some examples of casting formulations are shown in U.S. Pat. Nos. 6,630,083 and 6,455,653, the disclosures of which are incorporated herein by reference.

Methacrylates are preferable as they tend to, e.g., possess less odor. There are other considerations, readily determinable by one skilled in the art, for selecting a certain monomer, such as e.g., refractive index, impact, hardness, etc.

The casting formulation may include a photoinitiator (e.g., from any family of photoinitiators). One example of a photoinitiator which may be used in the casting formulation is CIBA® Irgacure® 184; however, other photoinitiators, readily determinable by one skilled in the art, may be used. It is preferable to avoid using a photoinitiator that would induce UV cut-off that would interfere with the UV absorption range of the photochromics of the base lens 103.

The primer-coated photochromic lens 102 is placed in the mold assembly 101 with the primer coating 107 adjacent to the casting layer 109, distributing the monomer 109 evenly across the coated lens surface and forming a mold-lens assembly. A sufficient gap (e.g., preferably uniform in width from top to bottom) between the mold 101 and primer 107 is achieved and maintained throughout the curing process, so as to provide an area for the monomer to reside. An exemplary gap thickness may comprise, e.g., about 0.2 mm. The gap can be achieved, e.g., via placement of spacers (e.g., tape, pads) inside the mold; as many spacers may be applied therein as needed to separate the lens from the mold. Alternatively, the lens may be held above the mold 101 via mechanical means to create the necessary gap.

The curing process for bonding the casting layer 109 onto the primer coated lens 102 may include various techniques, including the imparting of pressure on the mold-lens assembly, exposure(s) to ultraviolet light, and/or exposure(s) to heat (e.g., placement of the mold-lens assembly in an oven) for specified periods of time. An exemplary curing process for a mold-lens assembly according to the present invention involves the application of pressure to the back concave surface of the lens, forcing it to contact against the spacers in the mold, and exposure of such pressurized mold-lens assembly to UV light from a UV source held at a predetermined distance from the mold (e.g., 100-250 mm) for a period of time (e.g., 10-40 seconds). Following this, the pressure is released and the assembly may be subjected to a thermal post cure (e.g., placed in an oven for a specified amount of time, e.g., around 3 hours). The resultant lens 202 is then removed from the mold.

Surprisingly, the resultant lens 202 includes both photochromic and multifocal properties imparted therein, which by virtue of the present invention, has now been successfully achieved in a single structure; indeed, the present invention advantageously results in the achievement of successful adherence of a casting composition to a photochromic lens. The composite multifocal (e.g., segmented) photochromic lens 202 comprises the base lens 103, photochromic layer 105, primer 107 and casting layer 109 including segment 110 in a single, optically effective unit.

The invention will be further clarified by considering the following, non-limiting examples.

EXAMPLES

The following procedure was used to form a multifocal photochromic lens according to the present invention. 5-base semi-finished single vision (SFSV) photochromic polycarbonate lenses were used as the base lens. Exemplary base lenses which may be utilized include any SFSV photochromic lenses, such as those manufactured by various ophthalmic companies.

In one test, a base lens including a photochromic coating alone was used; in another test a base lens having a photochromic coating and an anti-migrating coating was used. Such anti-migrating coating may include any coating intended to protect and keep the photochromic substances within the photochromic coating and prevent migration of same. Such anti-migrating coating may or may not have been subjected to a thermal post cure after application to the lens.

In one example, a polyurethane latex primer formulation including a coupling agent was prepared and applied to each base lens by spin coating methods of 300-750 rpm. Each lens was dried for 15 minutes at 80° C. (although lower drying temperatures e.g., of 40° C. may be contemplated as well). Drying times and/or drying temperature may be increased/decreased as necessary, with time and temperature being inter-dependant.

It is noted that a primer formulation according to the present invention is not limited to the use of a polyurethane latex, and other types of primers may be used, such as water-based acrylic emulsion primers. If a polyurethane latex is used, a preferred polyurethane latex is provided by Baxenden™ (W-234).

The ingredients and parts by weight of an exemplary primer formulation (here, e.g., a latex primer formulation which includes a coupling agent) are shown below:

| Ingredient | Parts by Weight |
| --- | --- |
| Polyurethane latex (e.g., W-234) | about 35 |
| Deionized water | about 50 |
| 2-Butoxy ethanol | about 15 |
| Coupling agent | about 5 |

A primer formulation according to the present invention is not limited to this or any particular latex material nor to these specific parts by weight; other types/amounts of primer materials (latex and/or acrylic materials, etc.) may be used as needed to suit the particular system of interest. Further, deionized water and alcohol are diluents and influence the coating uniformity across the lens surface; these ingredients may be changed or modified as needed. E.g., 2-Butoxy ethanol, is a diluent and drying agent, and other alcohols and/or other diluents that, e.g., are compatible may be used.

The coupling agent may comprise a solution (e.g., precondensed) of:

| Ingredient | Parts by Weight |
| --- | --- |
| Glymo (glycidoxypropyltrimethoxysilane) | about 10 |
| Acryloxypropyltrimethoxysilane | about 10 |
| 0.1N HCL | about 0.5 |
| Aluminum acetylacetonate | about 0.5 |
| Diacetone alcohol | about 1.0 |

Note that the coupling formulation is not limited to these particular ingredients and parts by weight; e.g., other glycidol-silane compounds and/or metal catalysts (metal acetylacetonates) in varying amounts can be utilized or modified as needed.

A surface casting formulation is prepared. Surface casting formulations of methacrylates and/or acrylates can be used. Methacrylates are favorable as they tend to possess less odor. A photoinitiator can be used from any family of photoinitiators. Irgacure® 184 (1-hydroxy cyclohexyl phenyl ketone) is colorless and makes a colorless casting upon UV exposure. Care should be taken to avoid using a photoinitiator that would induce UV cut-off that would interfere with the UV absorption range of the photochromics.

A (meth)acrylic surface casting monomer solution comprising the following ingredients and proportions was prepared in a side arm flask, stirring at 45° C. for 1.5 hours to thoroughly mix the components under vacuum for 1.5 hours or until suitably de-gassed:

|  |  | Weight % | Amount (grams) |
| --- | --- | --- | --- |
| SR ™ 349 | Bisphenyl A (meth)diacrylate | 75% | 37.50 g |
|  | Benzyle (meth)acrylate | 8% | 3.75 g |
| SR ™ 285 | Tetrahydrofurfuryl (meth)acrylate | 9% | 4.50 g |
| SR ™ 331 | 2-phenoxyethyl (meth)acrylate | 8% | 3.75 g |
|  | Irgacure ® (IRG) 184 | 1 phm* | 0.50 g |

*"phm" = parts per hundred monomer. E.g., a 1 phm IRG 184 acrylic formulation includes 1.0 g of IRG 184 per 100 g of acrylic monomer.

A 5-base, 150 addition semi-finished straight top (SFST) UV transparent mold was washed with soap and water, air dried and placed into a fixture that supports the mold at its perimeter. The fixture is machined at the center leaving the majority of the front surface of the mold exposed. Four pieces of paper tape, around 0.2 mm thick, were evenly spaced and affixed to the concave mold (or lens) surface as spacers. The acrylic monomer solution described above, was placed into the mold wetting out the bifocal region. Two such molds were prepared in this way.

In one test, the lens with the photochromic coating and latex primer including a coupling agent was placed in one mold on top of the monomer, distributing the monomer solution evenly across the lens. In another test, a lens with the photochromic coating, anti-migrating coating and latex primer including a coupling agent was placed in a second mold. Care was taken not to introduce bubbles. Just enough monomer is needed to wet out the lens surface.

A pneumatic device was used to apply constant pressure on each mold-lens assembly. A deformable membrane was inflated to 5 psig which applied pressure to the back concave side of each lens, forcing it to contact against the spacers on the mold and leaving a thin gap for the monomer to reside. The mold-lens assembly was placed into a UV chamber set at 120 W and 70° C. with a D-type bulb (e.g., bulb with a deeper UV spectral output) positioned around 150 mm from the mold. The front of the mold was exposed to UV light for 30 seconds. The pressure was then released and the mold-lens assembly was removed from the UV chamber and subjected to 4-passes in a Fusion® D-bulb conveyor (high-powered UV source) set at around 9 feet/min. The mold-lens assembly was placed into an oven at 105° C. for 3 hours.

The lenses were then removed from their respective molds. As a test, adhesive tape was applied to the surface casting of each lens and quickly pulled; however, the casting did not separate from the lens. The present invention has advantageously enabled a surface casting to be successfully adhered to a photochromic lens.

As a control, polycarbonate (PC) lenses having a photochromic layer were provided, both with and without an anti-migrating protecting layer. Typical adhesion promoting techniques, known in the art such as plasma or corona treatments, were performed to these layers. Upon application of a surface casting layer, there was no adhesion of the surface casting to the surface of the control lenses.

Subsequent castings (with 0.50 phm or 1.0 phm photoinitiator) have been performed under various UV exposure conditions (time of curing step between about 10 to about 30 seconds), using a primer formulation with or without a coupling agent according to the present invention. Each casting has successfully passed adhesion tests.

In other embodiments, a primer composition according to the present invention may comprise about 1 to 100 parts by weight of polyurethane latex, about 0 to 50 parts by weight of 2-butoxy ethanol, about 0 to 99 parts by weight of deionized water, and about 0 to 50 parts by weight of a coupling agent.

In other embodiments, a casting composition according to the present invention may comprise, e.g., about 30 to 80 weight % of bispeny A (meth)diacrylate, about 0 to 25 weight % of benzyle (meth)acrylate, about 0 to 25 weight % of tetrahydrofurfuryl (meth)acrylate, about 0 to 25 weight % of 2-phenoxyethy (meth)acrylate, and about 0.01 to 5 phm of IRG® 184.

In other embodiments, a coupling agent according to the present invention may comprise a precondensed solution of about 5 to 15 parts by weight of glycidoxypropyltrimethoxysilane, about 5 to 15 parts by weight of acryloxypropyltrimethoxysilane, about 0.5 parts by weight of 0.1N HCL, about 0.5 parts by weight of aluminum acetylacetonate, and about 0.5 to 1.0 parts by weight of diacetone alcohol.

Examples using water-based acrylic emulsion primers (e.g., JOHNSON® Joncryl® emulsions) are now shown. Primer solutions were applied by spin coating at 350-700 rpm and then dried for 15 minutes at 80° C. Lenses were cast using the same formulation mentioned in the previous examples. The lenses were exposed to UV light at 80 W for 2 seconds, then subjected to 4 passes in a Fusion® conveyor using an H+ bulb at around 8 feet/minute. The results were as follows:

| Primer | Appearance | Adhesion |
| --- | --- | --- |
| Joncryl ® 1907 | clear | poor |
| Joncryl ® 2561 | clear | poor |
| Joncryl ® 1531 | opaque | good |

In the ophthalmic field, the present invention could be applied in mass production and Rx environments to generate semi-finished straight top polycarbonate (SFST-PC) photochromic lenses.

In addition, a primer formulation according to the present invention may be applied to other substrates or laminates other than those mentioned herewith for adhesion promotion and to impart adhesive qualities/abilities therein.

Having described preferred embodiments for the present invention, materials used therein and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for producing a photochromic multifocal optical lens comprising the steps of:
   providing a polycarbonate lens having a photochromic coating on an SV front surface of said lens and applying a primer formulation to the photochromic coating of the lens and drying same to produce a primer coated photochromic lens;
   providing a mold assembly including a segment region and applying a surface casting monomer solution into the mold to form a casting layer and wetting out the segment region, wherein the monomer solution includes about 75 weight % of bisphenyl A (meth)diacrylate with the balance comprising a mixture of benzyl (meth)acrylate, tetrahydrofurfuryl (meth)acrylate and 2-phenoxyethy (meth)acrylate; and about 1 part per hundred monomer (phm) of 1-hydroxy cyclohexyl phenyl ketone;
   placing the primer coated photochromic lens into the mold, such that the front surface of the primer-coated lens contacts the casting layer; and
   curing the casting layer to produce a segmented photochromic optical lens wherein the primer provides secure adhesion of the casting layer to the photochromic coating.

2. The method of claim 1, wherein the step of curing includes ensuring that an even gap exists between a mold surface and the front surface of the lens.

3. The method of claim 1, wherein the primer formulation is comprised of:
   about 35 parts by weight of polyurethane latex;
   about 15 parts by weight of 2-butoxy ethanol;
   about 50 parts by weight of deionized water; and
   about 5 parts by weight of a coupling agent.

4. The method of claim 3, wherein the coupling agent comprises a precondensed solution of:
   about 10 parts by weight of glycidoxypropyltrimethoxysilane;
   about 10 parts by weight of acryloxypropyltrimethoxysilane;
   about 0.5 parts by weight of 0.1N HCL;
   about 0.5 parts by weight of aluminum acetylacetonate; and
   about 1.0 parts by weight of diacetone alcohol.

5. The method of claim 1, wherein the monomer solution is comprised of:
   about 8 weight % of benzyl (meth)acrylate;
   about 9 weight % of tetrahydrofurfuryl (meth)acrylate; and
   about 8 weight % of 2-phenoxyethy (meth)acrylate.

6. The method of claim 1, wherein the mold comprises an ultraviolet light transparent mold assembly.

7. The method of claim 6, wherein the step of curing further comprises:
   exposing the mold assembly to at least one ultraviolet light for about 10 to 30 seconds, with or without heat.

8. The method of claim 7, further comprising the step of thermally curing the assembly after at least one UV exposure.

9. The method of claim 1, wherein primer is applied to the photochromic coating of the lens by spin coating.

* * * * *

UNITED STATES PATENT AND TRADEMARK OFFICE
CERTIFICATE OF CORRECTION

PATENT NO. : 8,029,707 B2  
APPLICATION NO. : 12/302214  
DATED : October 4, 2011  
INVENTOR(S) : Ronald Berzon, Eric Johnson and Herbert Mosse Page 1 of 1

It is certified that error appears in the above-identified patent and that said Letters Patent is hereby corrected as shown below:

Title page, item (75), line 2, delete "Pinella" and insert --Pinellas--; and

Title page, item (73), line 3, delete "le" and insert --Le--.

Signed and Sealed this

Seventeenth Day of April, 2012

David J. Kappos  
*Director of the United States Patent and Trademark Office*